US009267596B2

(12) United States Patent
Trost

(10) Patent No.: US 9,267,596 B2
(45) Date of Patent: Feb. 23, 2016

(54) AXLE ASSEMBLY WITH DIFFERENTIAL LUBRICATION

(71) Applicant: ArvinMeritor Technology, LLC, Troy, MI (US)

(72) Inventor: Harry Trost, Royal Oak, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 38 days.

(21) Appl. No.: 14/169,454

(22) Filed: Jan. 31, 2014

(65) Prior Publication Data
US 2015/0219206 A1    Aug. 6, 2015

(51) Int. Cl.
*F16H 57/04*    (2010.01)

(52) U.S. Cl.
CPC .......... *F16H 57/0483* (2013.01); *F16H 57/045* (2013.01); *F16H 57/0457* (2013.01); *F16H 57/0471* (2013.01)

(58) Field of Classification Search
CPC   F16H 57/045; F16H 57/0457; F16H 57/0483
See application file for complete search history.

(56) References Cited

U.S. PATENT DOCUMENTS

| 1,966,434 | A | * | 7/1934 | Barker .......................... 184/11.1 |
| 2,242,195 | A |   | 5/1941 | Teker et al. |
| 5,540,300 | A |   | 7/1996 | Downs et al. |
| 6,132,329 | A |   | 10/2000 | Tison |
| 6,997,284 | B1 | * | 2/2006 | Nahrwold ........... F16H 57/0447 165/117 |
| 8,974,342 | B2 | * | 3/2015 | Kwasniewski et al. ....... 475/160 |
| 2007/0032331 | A1 |   | 2/2007 | Green et al. |
| 2013/0296095 | A1 | * | 11/2013 | Kwasniewski et al. ....... 475/160 |
| 2014/0069230 | A1 | * | 3/2014 | Trost ............................... 74/607 |
| 2014/0243137 | A1 | * | 8/2014 | Kwasniewski ...... F16H 57/0483 475/160 |

FOREIGN PATENT DOCUMENTS

| DE | 710894 C | 9/1941 |
| EP | 2660493 A1 | 6/2013 |
| JP | 59-37462 U | 3/1984 |
| JP | 2012210839 A | 11/2012 |

OTHER PUBLICATIONS

European Patent Office, Extended European Search Report for the corresponding European Patent Application No. 14195728.2 mailed May 28, 2015.

* cited by examiner

*Primary Examiner* — Ramya Burgess
*Assistant Examiner* — Lillian Nguyen
(74) *Attorney, Agent, or Firm* — Brooks Kushman P.C.

(57) ABSTRACT

An axle assembly having a differential and a reservoir module disposed in a housing. The reservoir module may receive a lubricant and provide lubricant to a differential bearing.

20 Claims, 2 Drawing Sheets

AXLE ASSEMBLY WITH DIFFERENTIAL LUBRICATION

TECHNICAL FIELD

This patent application relates to an axle assembly that facilitates lubrication of a differential.

BACKGROUND

An axle assembly lubrication apparatus is disclosed in U.S. Pat. No. 6,132,329.

SUMMARY

In at least one embodiment, an axle assembly is provided. The axle assembly may include a housing, a differential bearing, a differential, a reservoir module, and an axle. The housing may have a center portion and an arm portion that may extend from the center portion. The differential bearing may be disposed proximate the housing. The differential may be disposed in the center portion and may have a case that may be rotatably supported by the differential bearing. The reservoir module may be disposed proximate the arm portion and may be configured to receive a lubricant. The reservoir module may have a tube portion and a first outlet. The first outlet may provide lubricant from the reservoir module to the differential bearing. The axle may be disposed in the arm portion and may extend through the tube portion.

In at least one embodiment, an axle assembly is provided. The axle assembly may include a housing, a differential, a first reservoir module, and a second reservoir module. The housing may have a center portion and first and second arm portions that may extend from the center portion. The differential may be disposed in the center portion and may be rotatably supported by first and second differential bearings that may be disposed proximate the housing. The differential may include a differential nest that may be disposed between the first and second differential bearings. The first reservoir module may be disposed in the first arm portion and may be configured to receive a lubricant. The first reservoir module may have a first outlet that may provide lubricant to the first differential bearing and a second outlet that may provide lubricant to the differential nest. The second reservoir module may be disposed in the second arm portion and may be configured to receive lubricant. The second reservoir module may have an outlet that may provide lubricant to the second differential bearing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
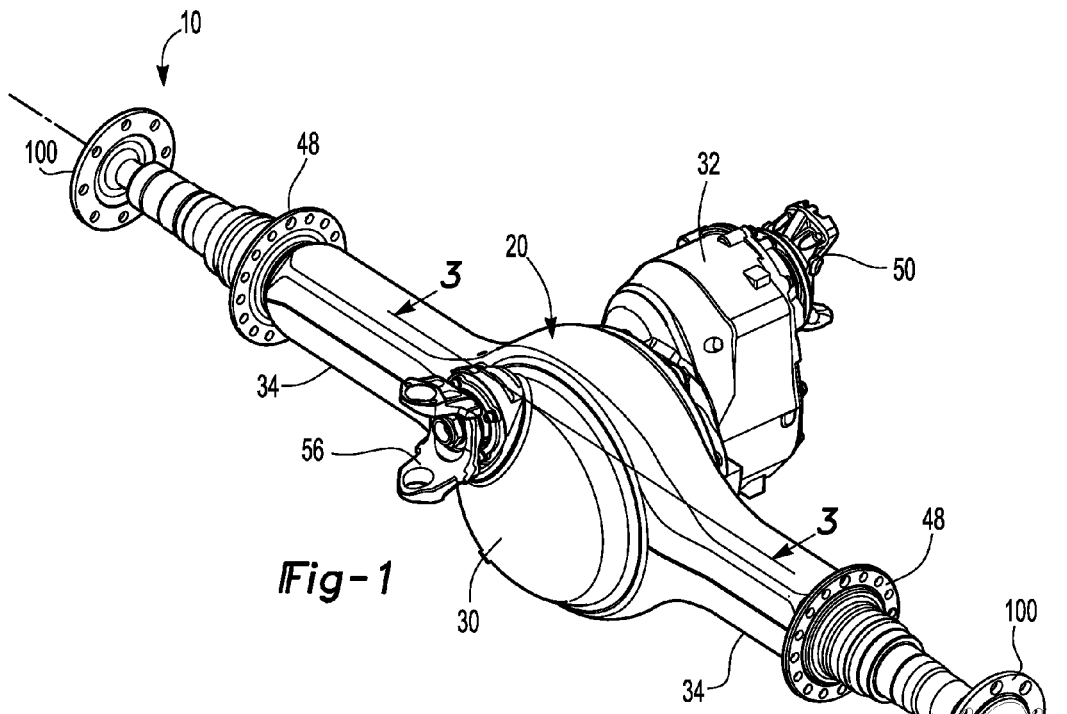
FIG. 1 is a perspective view of an exemplary axle assembly.
Figure 2:
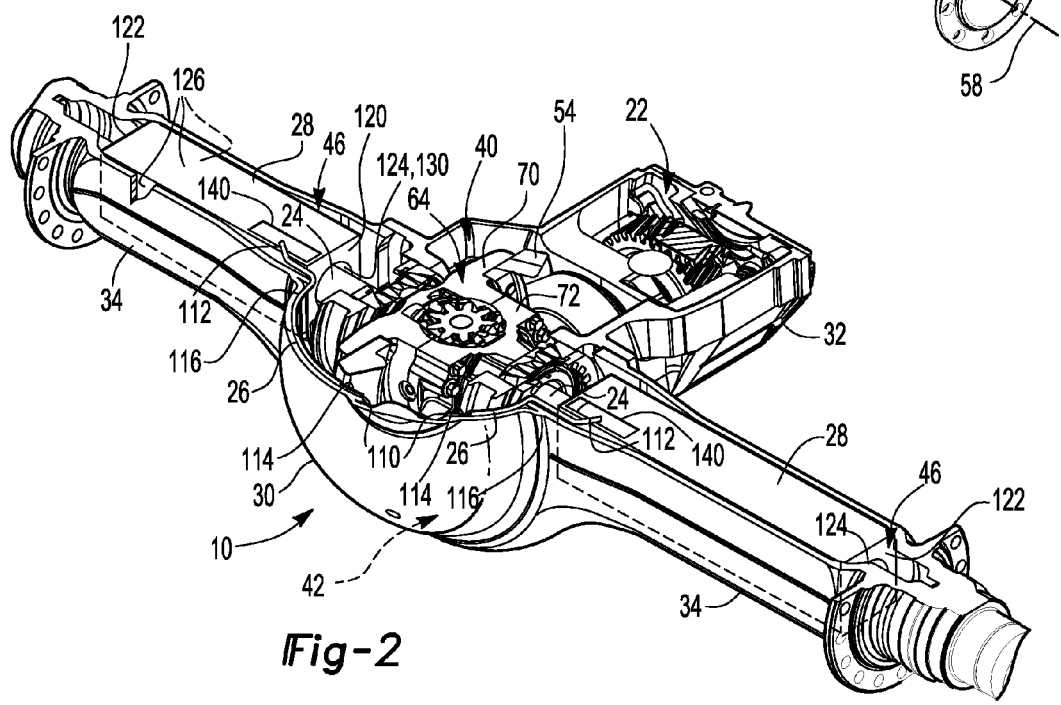
FIG. 2 is a fragmentary perspective view of a portion of the axle assembly.
Figure 3:
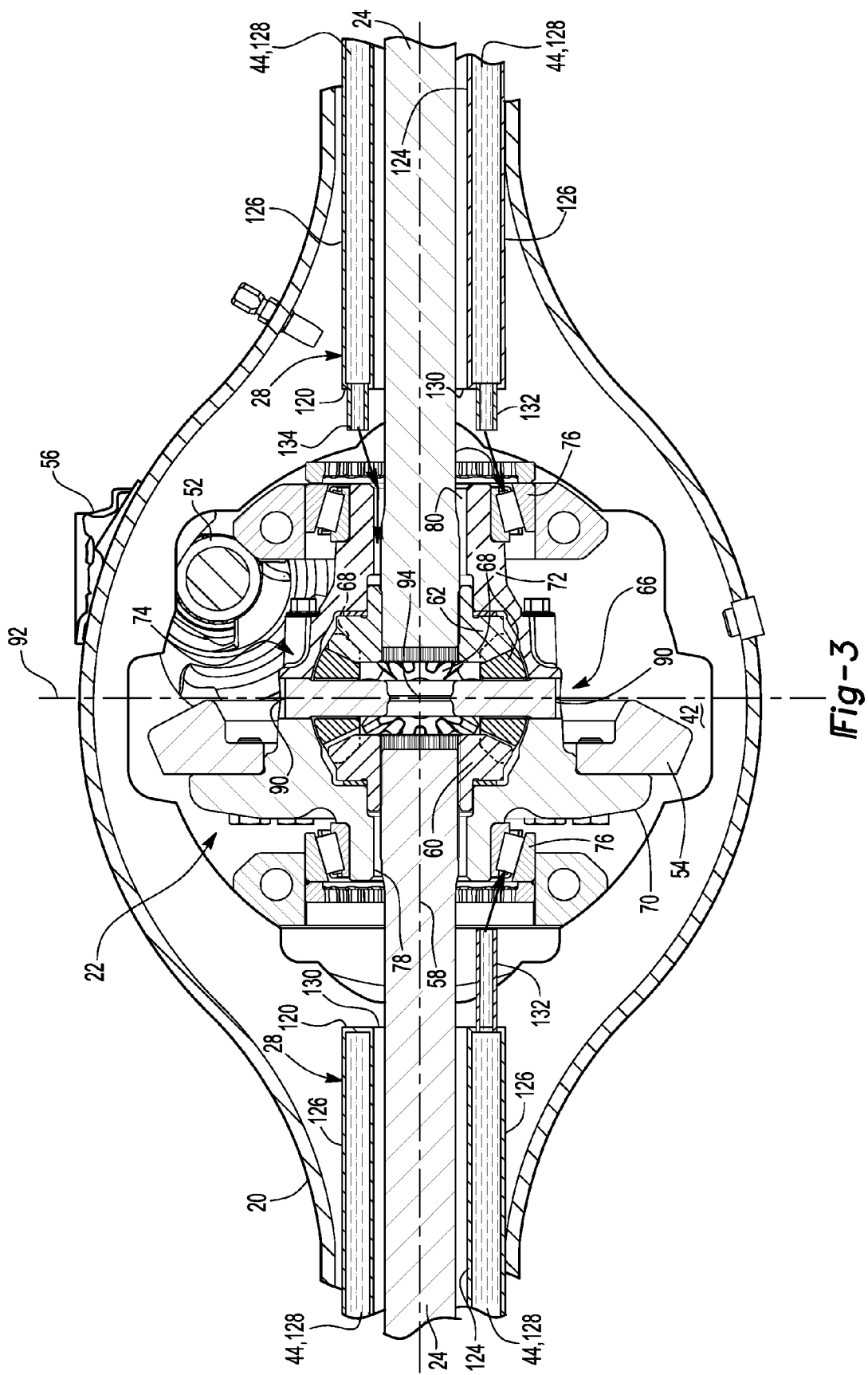
FIG. 3 is a section view of a portion of the axle assembly along section line 3-3.

Referring to FIGS. 1-3, an exemplary axle assembly 10 is shown. The axle assembly 10 may be provided with a motor vehicle like a truck, bus, farm equipment, mining equipment, military transport or weaponry vehicle, or cargo loading equipment for land, air, or marine vessels.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 shown in FIG. 1 may be part of a tandem axle configuration or multi-axle configuration that may include a plurality of axle assemblies that may be connected in series.

The axle assembly 10 may include a housing 20, a differential 22, at least one axle 24, at least one lubricant conduit 26, and at least one reservoir module 28.

The housing 20 may receive various components of the axle assembly 10. In addition, the housing 20 may facilitate mounting of the axle assembly 10 to the vehicle. The housing 20 may include multiple components that may be assembled together in any suitable manner, such as by welding and/or with one or more fasteners. In at least one embodiment, the housing 20 may include a center portion 30, a differential carrier portion 32, and at least one arm portion 34.

The center portion 30 may be disposed proximate the center of the housing 20. The center portion 30 may define a cavity 40 that may receive at least a portion of the differential 22. The region of the cavity 40 located below the differential 22 may at least partially define a sump portion 42 that may contain a lubricant 44. Splashed lubricant 44 may flow down the sides of the center portion 30 and gather in the sump portion 42. The lubricant 44, which may be a liquid such as oil, may lubricate components of the axle assembly 10, such as the differential 22, as will be discussed in more detail below.

The differential carrier portion 32 may be disposed proximate the center portion 30. The differential carrier portion 32 may support components of the differential 22 and may also define a cavity that may receive at least a portion of the differential 22. In at least one embodiment, the differential carrier portion 32 may be coupled to the center portion 30 in any suitable manner, such as with one or more fasteners like a bolt.

One or more arm portions 34 may extend from the center portion 30. In the embodiment shown in FIG. 1, two arm portions 34 are provided that extend in opposite directions from the center portion 30 and away from the differential 22. An arm portion 34 or a portion thereof may be integrally formed with the center portion 30 in one or more embodiments. Each arm portion 34 may define an arm cavity 46 that may receive an axle 24 and at least a portion of a reservoir module 28 as will be discussed in more detail below. The arm portion 34 and arm cavity 46 may be disposed above the sump portion 42 in one or more embodiments. Each arm portion 34 may also have a brake mounting flange 48 that may be disposed proximate an end of the arm portion 34.

The differential 22 may be disposed in the housing 20. The differential 22 may be configured to transmit torque to the vehicle traction wheel assemblies and permit the traction wheel assemblies to rotate at different velocities. An input yoke 50, an input shaft 52, a ring gear 54, and an optional output yoke 56 are shown in at least one of FIGS. 1-3 to facilitate an abbreviated discussion of the operation of the differential 22.

The input yoke 50 may facilitate coupling of the axle assembly 10 to a torque source. For example, the input yoke 50 may be coupled to a drive shaft that may be coupled to an output of a vehicle transmission. Alternatively, the input yoke 50 may be coupled to a connection shaft or prop shaft that may be coupled to an output yoke 56 of another axle assembly or a transfer case. The input yoke 50 may be disposed on the input shaft 52, which is best shown in FIG. 3.

The input shaft 52 may be rotatably supported by one or more bearings that may be disposed in the differential carrier portion 32 of the housing 20. The input shaft 52 may be provided with or may be operatively connected to one or more intermediate gears that may be configured to provide torque to the ring gear 54 and to the output yoke 56, if provided. For example, a pinion gear (not shown) may be provided at an end of the input shaft 52 that may be disposed opposite the input yoke 50. Torque that is provided to the input yoke 50 and input shaft 52 may be transmitted to the ring gear 54 via a pinion gear.

The ring gear 54 may rotate about an axis 58 and may splash lubricant 44 that accumulates in the sump portion 42 as it rotates. As will be discussed in more detail below, such lubricant 44 may be captured and temporarily retained or stored in a reservoir module 28 to reduce the volume of lubricant 44 in the sump portion 42 under various operating conditions. Reducing the volume of lubricant 44 in the sump portion 42 may reduce churning losses or frictional drag that may be exerted upon the ring gear 54 by the lubricant 44 and may improve vehicle fuel economy. Torque may be transmitted from the ring gear 54 to each axle 24 via the differential 22.

The differential 22 may be disposed in the housing 20 and may be configured to permit the axles 24 to rotate at different speeds. The differential 22 may be generally disposed in the center portion 30 of the housing 20. As is best shown in FIG. 3, the differential 22 may include a first output gear 60, a second output gear 62, a case 64, a spider 66, and a plurality of pinion gears 68.

The first output gear 60 may be disposed proximate a first axle 24. For example, the first output gear 60 may extend around the axis 58 and may have a center bore. The center bore may have a spline that may receive and engage a corresponding spline on the first axle 24 to inhibit rotation of the first output gear 60 with respect to the first axle 24. The first output gear 60 may include a set of teeth that may mesh with one or more pinion gears 68.

The second output gear 62 may be spaced apart from and disposed opposite the first output gear 60. The second output gear 62 may have substantially the same configuration as the first output gear 60 in one or more embodiments. The second output gear 62 may be disposed proximate the second axle 24 and may extend around the axis 58 and may have a center bore. The center bore may have a spline that may receive and engage a corresponding spline on the second axle 24 to inhibit rotation of the second output gear 62 with respect to the second axle 24. The second output gear 62 may also include a set of teeth that may mesh with one or more pinion gears 68.

The case 64 may receive various components of the differential 22. The case 64 may be spaced apart from the housing 20, the first axle 24, and the second axle 24 to facilitate rotation of the case 64 with respect to at least one of these components. In the embodiment shown, the case 64 has a two piece construction that includes a first case portion 70 and a second case portion 72. The area inside the case 64 that may receive the spider 66 may be referred to as a differential nest 74.

The first case portion 70 may be configured to rotate with respect to the housing 20. For instance, the first case portion 70 may be rotatably disposed on a differential bearing 76 that may be disposed in the housing 20 and that may facilitate rotation of the first case portion 70 about the axis 58. The differential bearing 76 may be mounted on the differential carrier portion 32 in one or more embodiments. The first case portion 70 may support the ring gear 54. The ring gear 54 may be fixedly disposed on the first case portion 70 in any suitable manner, such as with one or more fasteners like a bolt, to inhibit rotation of the ring gear 54 with respect to the first case portion 70. The first case portion 70 may include an opening 78. The opening 78 may be configured as a through hole that may extend along the axis 58. The first axle 24 may extend through the opening 78. In addition, the first output gear 60 may be rotatably disposed in the opening 78 such that the first output gear 60 may rotate about the axis 58 with respect to the first case portion 70.

The second case portion 72 may be disposed opposite the first case portion 70. The second case portion 72 may be fixedly disposed on the first case portion 70 in any suitable manner, such as with one or more fasteners like bolts, to inhibit rotation of the second case portion 72 with respect to the first case portion 70. The second case portion 72 may be configured to rotate with respect to the housing 20. For instance, the second case portion 72 may be rotatably disposed on a differential bearing 76 that may be disposed in the housing 20 and that may facilitate rotation of the second case portion 72 about the axis 58. The second case portion 72 may include an opening 80. The opening 80 may be configured as a through hole that may extend along the axis 58. The second axle 24 may extend through the opening 80. In addition, the second output gear 62 may be rotatably disposed in the opening 80 such that the second output gear 62 may rotate about the axis 58 with respect to the second case portion 72.

The case 64 and differential nest 74 may disposed between the differential bearings 76. The differential nest 74 may receive gears and moving components such as the first output gear 60, the second output gear 62, the spider 66, and the pinion gears 68.

The spider 66 may be disposed in the case 64 and may be configured to rotate about the axis 58. The spider 66 may include a set of pins 90. The pins 90 may extend away from the axis 58 and may be arranged along a first spider axis 92 and a second spider axis 94. The first spider axis 92 and the second spider axis 94 may intersect and may be disposed substantially perpendicular to each other and substantially perpendicular to the axis 58 in one or more embodiments. Ends of the pins 90 may be received in the case 64 and may be spaced apart from the housing 20 so as not to interfere with rotation of the differential 22. For instance, the pins 90 may be received between the first case portion 70 and the second case portion 72.

A pinion gear 68 may be rotatably disposed on each pin 90. Each pinion gear 68 may be generally disposed in the case 64. In at least one embodiment, two pinion gears 68 may rotate about pins 90 that extend along the first spider axis 92 and two pinion gears 68 may rotate about pins 90 that extend along the second spider axis 94. Each pinion gear 68 may include a set of teeth that may mate with the first output gear 60 and the second output gear 62.

The axles 24 may transmit torque from the differential 22 to a traction wheel assembly. In FIGS. 1 and 2, two axles 24 are provided such that each axle 24 extends through a different arm cavity 46. The axles 24 may extend along and may be rotated about the axis 58 by the differential 22. Each axle 24 may have a first end and a second end. The first end may be coupled to the differential 22. The second end may be disposed opposite the first end and may be located outside of the housing 20. An axle flange 100 may be disposed at the second end and may facilitate mounting of a wheel end assembly and traction wheel assembly. An axle bearing (not shown) may be provided between the first and second ends of the axle 24 to rotatably support the axle 24. The axle bearing may be located between the reservoir module 28 and the axle flange 100 in one or more embodiments.

Referring to FIG. 2, at least one lubricant conduit 26 may be provided to route lubricant 44 to a reservoir module 28. A lubricant conduit 26 may be configured to receive or capture lubricant 44 that is splashed or sprayed inside the housing 20 by the differential 22. In at least one embodiment, the lubricant conduit 26 or a portion thereof may be configured as a groove or open channel that may receive lubricant 44 that is sprayed or splashed by a rotating ring gear 54 or that drips down an interior surface of the center portion 30. Such a groove or channel may face upward or generally away from the sump portion 42 or may include an opening through which lubricant 44 may be received. The lubricant conduit 26 also be configured to direct lubricant to the differential 22, but may be spaced apart from the ring gear 54 so as to not interfere with rotation of the ring gear 54 or strip lubricant 44 from the ring gear surfaces. The lubricant conduit 26 may be configured to capture lubricant and provide captured lubricant to a reservoir module 28 when the vehicle is travelling above a threshold speed. For example, the rotation speed of the ring gear 54 may increase as the vehicle travels faster. Increased rotation speed of the ring gear 54 may change the spray profile of lubricant 44 that is sprayed or splashed by the ring gear 54 in the housing 20. The lubricant conduit 26 may be configured, positioned, or oriented such that no lubricant or a negligible amount of lubricant 44 is captured below a threshold speed and an appreciable amount of lubricant 44 is captured at or above the threshold speed. The threshold speed may be established based on vehicle development testing and evaluation of the performance characteristics of the axle assembly 10. As a non-limiting example, the threshold speed may be a speed such as around 30 mph (48 km/h). As such, the lubricant conduit 26 and the reservoir module 28 may be calibrated such that the level of lubricant 44 in the sump portion 42 drops below the differential bearings 76 above the threshold speed to help reduce frictional drag on the ring gear 54.

The lubricant conduit 26 may extend along an interior surface of the center portion 30 and the arm portion 34 of the housing 20 in one or more embodiments. For example, the lubricant conduit 26 may be integrally formed with the housing 20. Alternatively, the lubricant conduit 26 may be provided as a separate component that may be coupled to the housing 20 in any suitable manner, such as by welding or with a fastener. In addition, a lubricant conduit 26 or a portion thereof may slope downwardly from the center portion 30 of the housing 20 toward a reservoir module 28 to facilitate the flow of lubricant 44 to a reservoir module 28.

A lubricant conduit 26 may route lubricant 44 to one or more reservoir modules 28. For instance, a single lubricant conduit 26 may be provided that has opposing ends that terminate at different reservoir modules 28. Alternatively, a lubricant conduit 26 may provide lubricant 44 to a single reservoir module 28 as depicted in the embodiment shown in FIG. 2. More specifically, two lubricant conduits 26 are shown in FIG. 2 that provide lubricant 44 to different reservoir modules 28. In such an embodiment, the lubricant conduit 26 may include a first end 110 and a second end 112.

The first end 110 may be disposed in the cavity 40 of the center portion 30 to help capture lubricant 44 as previously described. At least a portion of the lubricant conduit 26 in the center portion 30 or near the first end 110 may include an upward facing opening 114. In FIG. 2, the opening 114 extends from the first end 110 toward the second end 112. Such an opening 114 may be provided by removing an upper section of a pipe or tube in one or more embodiments or by integrally forming a groove or channel with the housing 20 as previously discussed.

The second end 112 may be disposed opposite the first end 110. The second end 112 may be located in the arm portion 34 of the housing 20 and may terminate at or near an inlet of the reservoir module 28. A region near the second end 112 may be enclosed or may include an enclosed portion 116 to help retain lubricant 44 within the lubricant conduit 26 as it is routed to the reservoir module 28. For instance, the enclosed portion 116 of the lubricant conduit 26 may define a through hole through which lubricant 44 may flow. In at least one embodiment, the enclosed portion 116 may begin in the center portion 30 and may end at the reservoir module 28. Alternatively, the enclosed portion 116 may be omitted in one or more embodiments.

At least one reservoir module 28 may be provided to receive lubricant 44 and/or temporarily contain or retain a volume of lubricant 44 that might otherwise accumulate in the sump portion 42. A reservoir module 28 may be at least partially disposed in at least one arm portion 34 of the housing 20. Moreover, a reservoir module 28 may extend into the center portion 30 above the sump portion 42 as is best shown in FIG. 3.

Referring to FIGS. 2 and 3, an exemplary reservoir module 28 is shown. The reservoir module 28 may include a first end plate 120, a second end plate 122, a tube portion 124, and a set of side plates 126 that may cooperate to at least partially define a reservoir cavity 128 that may be configured to hold or contain a volume of lubricant 44. In FIG. 3, the reservoir cavity 128 is shown filled, but may contain a lesser volume of lubricant 44. The reservoir modules 28 may output lubricant 44 due to fluid pressure rather than through the use of a pump in one or more embodiments. Moreover, the reservoir modules 28 may be configured such that a valve may not be provided to control the flow of lubricant 44 through one or more outlets, thereby reducing costs and potential valve control components.

The first end plate 120 may face toward the differential 22. The first end plate 120 may be spaced apart from the arm portion 34 and may be disposed in the center portion 30 in one or more embodiments. The first end plate 120 may include tube opening 130, a first outlet 132, and optionally a second outlet 134.

The first outlet 132 may be configured as a through hole that may extend through the first end plate 120 to the reservoir cavity 128. The first outlet 132 may be disposed generally below the tube opening 130. The first outlet 132 may be sized to control the flow of lubricant 44 out of the reservoir cavity 128. For instance, the first outlet 132 may be sized such that the volume of lubricant 44 that flows out of the reservoir module 28 at low vehicle speeds (i.e., low differential rotational speeds) may be less than the volume of lubricant 44 that flows out of the reservoir module 28 at high vehicle speeds (i.e., high differential rotational speeds). The first outlet 132 may direct or provide lubricant 44 to a differential bearing 76. For instance, the first outlet 132 may be configured as a tube that extends from the first end plate 120 toward the differential 22 and may have an end that may be disposed proximate the differential bearing 76. The tube may extend substantially parallel to the axis 58 in one or more embodiments.

The second outlet 134 may be configured as a through hole that may extend through the first end plate 120 to the reservoir cavity 128. The second outlet 134 may be disposed generally above the axis 58, the tube opening 130, and/or the first outlet 132. The second outlet 134 may be configured to provide lubricant 44 to the differential nest 74. For instance, the second outlet 134 may be configured as a tube that extends from the first end plate 120 toward the differential 22 and may have an end that is disposed near the case 64. The second outlet 134 may be provided on a reservoir module 28 that faces toward the teeth of the ring gear 54 in one or more embodiments. Lubricant 44 may flow through the opening 78 and between the axle 24 and the case 64 to the differential nest 74. The second outlet 134 may extend substantially parallel to the axis 58 in one or more embodiments.

The second outlet 134 may be provided with a single reservoir module 28 so that lubricant 44 from the second outlet 134 may flow into the differential nest 74 to provide "fresh" lubricant by flushing lubricant out of the differential nest 74. Providing a second outlet 134 with multiple reservoir modules 28 may result in lubricant flow streams that may oppose each other, which may trap lubricant in the differential nest 74 and inhibit flushing of lubricant from the differential nest 74, which may reduce lubrication efficacy.

The second end plate 122, which is best shown in FIG. 1, may be disposed at an opposite end of the reservoir module 28 from the first end plate 120. The second end plate 122 may engage one or more surfaces of the arm portion 34 to help position the reservoir module 28. The second end plate 122 may optionally include an outlet that be configured to provide lubricant 44 to an axle bearing.

The tube portion 124 may extend from the first end plate 120 to the second end plate 122 and may be spaced apart from the axle 24. In at least one embodiment, the tube portion 124 may generally extend along the axis 58 and may have a generally cylindrical configuration. In at least one embodiment, the tube portion 124 may be configured to flex with respect to the axle 24 to help facilitate installation. For example, the tube portion 124 may be made of a flexible material, such as a polymeric material like a plastic, rubber, or synthetic rubber such as neoprene. In addition, lubricant 44 may also pass through the tube portion 124 to provide lubricant 44 to an axle bearing. For example, lubricant 44 may splash into and flow along the tube portion 124 or may be carried along the axle 24 through the tube portion 124 toward the second end plate 122 and may drip off the axle 24 or a reservoir module 28 to lubricate an axle bearing or components that may be located outwardly from the second end plate 122.

Referring to FIGS. 2 and 3, the set of side plates 126, if provided, may include one or more members that may at least partially define a side of the reservoir module 28. Each side plate 126 may extend from the first end plate 120 to the second end plate 122. In at least one embodiment, each side plate 126 may be disposed adjacent to and may engage at least one other side plate 126. In the embodiment shown, four side plates 126 are provided that engage at least two other side plates 126 to provide a box-like configuration in which opposing pairs of side plates 126 are disposed substantially parallel to each other. As such, the reservoir cavity 128 may be disposed between the side plates 126 and the tube portion 124, thereby providing an enclosed cavity that allows the reservoir cavity 128 to extend around the axle 24 in a ring-like manner. Such a configuration may facilitate lubricant storage without enlarging the housing 20 or arm portions 34 to increase the volume or available space in the housing 20. One or more of the side plates 126 may be omitted and the arm portion 34 of the housing 20 may define a portion of the reservoir module 28 in one or more embodiments.

The reservoir module 28 may also include an inlet 140 that receives lubricant 44 from the lubricant conduit 26. The lubricant conduit 26 may be disposed near the inlet 140 or extend into the inlet 140 in one or more embodiments. The inlet 140 may be configured as a through hole and may be provided in the first end plate 120 or a side plate 126 in various embodiments. In the embodiment shown in FIG. 2, the inlet 140 is disposed in the side plate 126 that is located at the top of the reservoir module 28 and near the first end plate 120.

The axle assembly 10 may allow passive lubrication of internal components due to rotation of the ring gear 54 or operation of the axle assembly 10. Moreover, lubricant 44 may be continuously circulated through the reservoir module 28 rather than stored in a reservoir by closing a valve to inhibit lubricant from flowing out of an outlet, which may promote more uniform lubricant temperature as compared to storing lubricant for extended periods in a tank where lubricant temperature can increase and require periodic dump releases to equalize lubricant temperature.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a housing having a center portion and an arm portion that extends from the center portion;
    a differential bearing that is disposed proximate the housing;
    a differential that is disposed in the center portion and that has a case that is rotatably supported by the differential bearing;
    a reservoir module that is disposed proximate the arm portion and configured to receive a lubricant, the reservoir module having a tube portion and a first outlet, wherein the first outlet provides lubricant from the reservoir module to the differential bearing; and
    an axle that is disposed in the arm portion such that the axle extends through the tube portion.

2. The axle assembly of claim 1 wherein the first outlet is disposed below the axle.

3. The axle assembly of claim 1 wherein the axle rotates about an axis and the first outlet is disposed below the axis.

4. The axle assembly of claim 1 wherein the reservoir module includes a first end plate and the first outlet is configured as a tube that extends from the first end plate toward the differential.

5. The axle assembly of claim 4 wherein the axle rotates about an axis and the first outlet extends substantially parallel to the axis.

6. The axle assembly of claim 1 wherein the reservoir module further comprises a second outlet that is disposed above the first outlet and that provides lubricant to a differential nest that is defined by the case.

7. The axle assembly of claim 6 wherein the second outlet is disposed above the axle.

8. The axle assembly of claim 6 wherein the axle rotates about an axis and the second outlet is disposed above the axis.

9. The axle assembly of claim 6 wherein the reservoir module includes a first end plate and the second outlet is configured as a tube that extends from the first end plate toward the differential.

10. The axle assembly of claim 9 wherein the first end plate is spaced apart from the housing.

11. An axle assembly comprising:
a housing having a center portion and first and second arm portions that extend from the center portion;
a differential that is disposed in the center portion and is rotatably supported by first and second differential bearings that are disposed proximate the housing, wherein the differential includes a differential nest that is disposed between the first and second differential bearings;
a first reservoir module that is disposed in the first arm portion and is configured to receive a lubricant, wherein the first reservoir module has a first outlet that provides lubricant to the first differential bearing and a second outlet that provides lubricant to the differential nest; and
a second reservoir module that is disposed in the second arm portion and is configured to receive lubricant, wherein the second reservoir module has an outlet that provides lubricant to the second differential bearing.

12. The axle assembly of claim 11 wherein the second reservoir module does not have a second outlet that provides lubricant to the differential nest to facilitate flow of the lubricant to and through the differential nest.

13. The axle assembly of claim 12 wherein the differential nest is disposed in a case of the differential and includes a spider that rotates about an axis, at least one pinion gear that is rotatably disposed on the spider, and first and second output gears that are disposed proximate first and second axles, respectively.

14. The axle assembly of claim 11 wherein the first and second reservoir modules each include a first end plate, a second end plate, and a tube portion that extends from the first end plate to the second end plate, wherein lubricant is stored between the first end plate and the second end plate.

15. The axle assembly of claim 14 wherein a first axle extends through and is spaced apart from the tube portion of the first reservoir module and a second axle extends through and is spaced apart from the tube portion of the second reservoir module.

16. The axle assembly of claim 14 wherein the first end plate, the second end plate, and the tube portion at least partially define a reservoir cavity that stores lubricant.

17. The axle assembly of claim 16 further comprising a set of side plates, wherein each member of the set of side plates extends from the first end plate to the second end plate and is spaced apart from the tube portion.

18. The axle assembly of claim 17 wherein each member of the set of side plates engages at least one other member of the set of side plates.

19. The axle assembly of claim 11 wherein the axle assembly further comprises a lubricant conduit that is disposed in the housing for providing the lubricant to an inlet of the first and second reservoir modules.

20. The axle assembly of claim 19 wherein the lubricant conduit receives lubricant that is splashed by a ring gear that is disposed in the housing.

* * * * *